(12) United States Patent
Chien et al.

(10) Patent No.: US 6,700,774 B2
(45) Date of Patent: Mar. 2, 2004

(54) ELECTRONIC APPARATUS WITH KEYBOARD MODULE WHICH CAN BE ROTATED AND HIDDEN

(75) Inventors: Chung-Chi Chien, Taipei (TW); Wu-Yung Chen, Taipei (TW); Chih-Chuan Cheng, Taipei (TW)

(73) Assignee: Compal Electronics Inc., Taipei (TW)

( * ) Notice: Subject to any disclaimer, the term of this patent is extended or adjusted under 35 U.S.C. 154(b) by 17 days.

(21) Appl. No.: 10/073,250

(22) Filed: Feb. 13, 2002

(65) Prior Publication Data

US 2003/0151888 A1 Aug. 14, 2003

(51) Int. Cl.⁷ .................................................. G06F 1/16
(52) U.S. Cl. ........................ 361/680; 361/679; 361/683
(58) Field of Search ................................ 361/679–686, 361/724–727

(56) References Cited

U.S. PATENT DOCUMENTS 5,712,760 A * 1/1998 Coulon et al. .............. 361/680
5,949,642 A * 9/1999 Park .......................... 361/681
6,256,192 B1 * 7/2001 Shannon ..................... 361/683

* cited by examiner

Primary Examiner—Darren Schuberg
Assistant Examiner—Yean Hsi Chang
(74) Attorney, Agent, or Firm—Bacon & Thomas, PLLC

(57) ABSTRACT

Electronic apparatus with keyboard module which can be rotated and hidden. The electronic apparatus includes an electronic apparatus main body and a keyboard module. One side of the main body is provided with pivot notches. The keyboard module is pivotally connected with the side of the main body via bracket members freely pivotally inlaid in the pivot notches. The keyboard module can be turned rearward to attach to back face of the main body and hidden behind the main body for easy carriage. In addition to the virtual keyboard on the operation panel of the electronic apparatus, a user can alternatively pivot the keyboard module toward the operation panel for quickly keying in data.

6 Claims, 4 Drawing Sheets

ELECTRONIC APPARATUS WITH KEYBOARD MODULE WHICH CAN BE ROTATED AND HIDDEN

BACKGROUND OF THE INVENTION

The present invention is related to an electronic apparatus with keyboard module which can be rotated and hidden for easy carriage. It is unnecessary to additionally connect a keyboard module with the electronic apparatus and a user can pivot the keyboard module outward for quickly keying in data.

There are various handheld electronic apparatuses such as PDA, tablet PC, etc. A touch-controlled operation panel (such as an LCD panel) is disposed on a front face of the main body of such handheld electronic apparatus. Multiple audio and video adjustment switches are arranged on one side of the panel. In addition, a controlling section is provided on the panel for controlling the functions of the panel.

A touch-type optical pen is positioned in a cavity formed on one side of the main body. A soft contact section is disposed at one end of the optical pen for touching and selecting options of the panel.

The handheld electronic apparatus has minimized volume and thus can be placed in a pocket and easily carried, while having almost the same functions as a desktop or notebook-type computer. However, such handheld electronic apparatus still has some shortcomings. For example, an inbuilt software program establishes a virtual keyboard picture on the panel of the electronic apparatus for a user to touch with the optical pen. The picture has a very small size so that when touching the virtual keyboard, the user often fails to select a correct option. Moreover, with the optical pen, it is impossible for the user to quickly input necessary symbols or characters.

In order to solve this problem, an improved electronic apparatus has been developed. One side of the main body of the improved electronic apparatus is provided with an input/output port for externally connecting with a wired or wireless keyboard. Accordingly, a user can use the externally connected keyboard to quickly key in symbols or characters. However, when not used, it is inconvenient to carry or store the externally connected keyboard.

Furthermore, both the above touch-type handheld electronic apparatuses lack any self-supporting design to facilitate use of the electronic apparatuses. Therefore, when used, a user must place the electronic apparatus on a plane face or hold the electronic apparatus with one hand. When held in the hand, it will be impossible for the user to use the externally connected keyboard. In the case that the electronic apparatus is directly placed on a plane face, the user will be unable to clearly see the panel. In order to solve this problem, an externally connected support seat has been developed for supporting the electronic apparatus. However, such externally connected support seat will enlarge the volume of the handheld electronic apparatus and lead to inconvenience in carriage of the electronic apparatus.

SUMMARY OF THE INVENTION

It is therefore a primary object of the present invention to provide an electronic apparatus with a keyboard module which can be rotated and hidden. The keyboard module includes an operation panel on a front face and a back face opposite the front face. By means of bracket members, a keyboard module is pivotally connected with one side of the main body of the electronic apparatus. The keyboard module can be forward pivoted on the bracket members for use or rearward pivoted to attach to the back face of the main body and hidden behind the main body for easy carriage. In addition to the virtual keyboard on the operation panel of the electronic apparatus, a user can alternatively use the keyboard module for quickly keying in data.

It is a further object of the present invention to provide the above electronic apparatus in which a support cover is pivotally connected with the other side of the main body. When not used, the support cover is overlaid on the back face of the main body to cover the keyboard module and prevent the keyboard module from loosening. When the keyboard module is turned outward for use, the support cover serves to adjustably support the main body by an optimal angle for a user to clearly see the panel.

The present invention can be best understood through the following description and accompanying drawings wherein:

DETAILED DESCRIPTION OF THE PREFERRED EMBODIMENTS

Figures 1, 2:
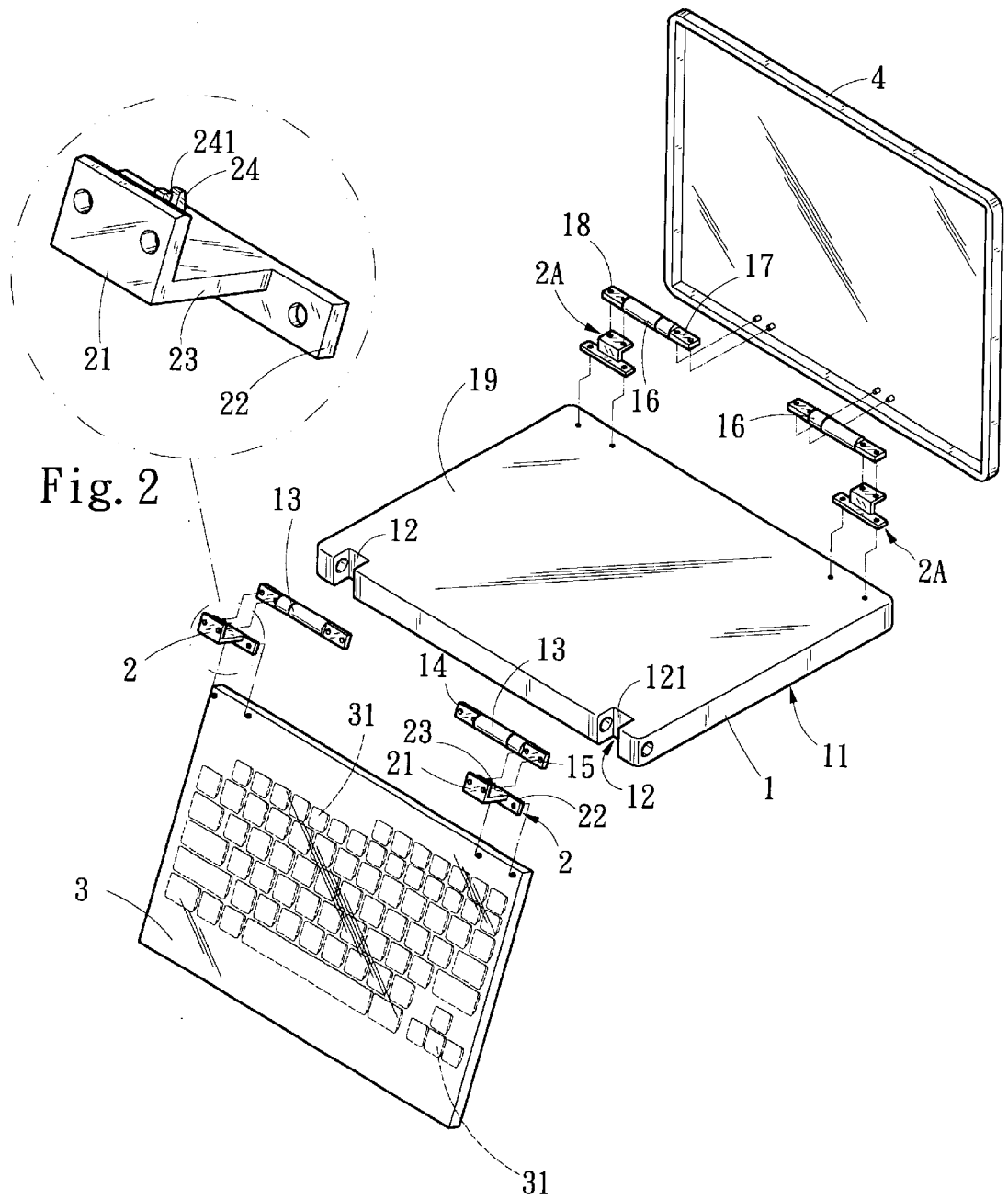
FIG. 1 is a perspective exploded view of the present invention.
FIG. 2 is an enlarged view of the bracket member of the present invention.
Figures 3, 4:
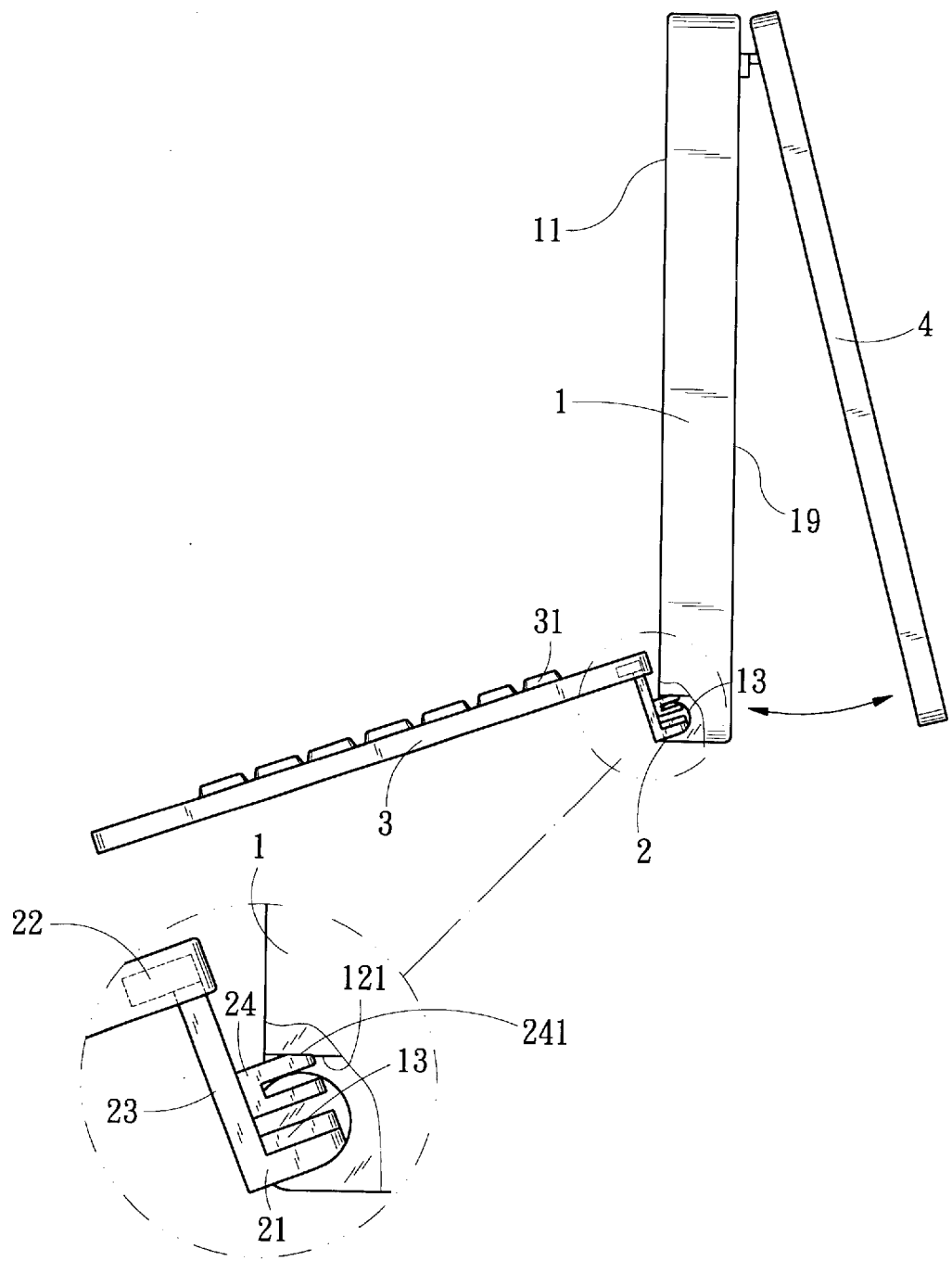
FIG. 3 is a side view showing that the keyboard module of the electronic apparatus is turned outward from the main body.
FIG. 4 is an enlarged view showing that the bracket member of the present invention abuts against an inner side of the pivot notch of the main body.

Please refer to FIGS. 1 and 2. The present invention includes an electronic apparatus main body 1, bracket members 2 and keyboard module 3. The front face of the electronic apparatus main body 1 is provided with an operation panel 11 (as shown in FIG. 3). One side of the main body 1 is formed with pivot notches 12. A fixed end 14 of a first rotary shaft 13 is pivotally positioned in a lateral side of the pivot notch 12. A movable end 15 of the first rotary shaft 13 extends into the pivot notch 12 and is connected with a connecting section 21 of a bracket member 2 to form a pivot section.

Figure 5:
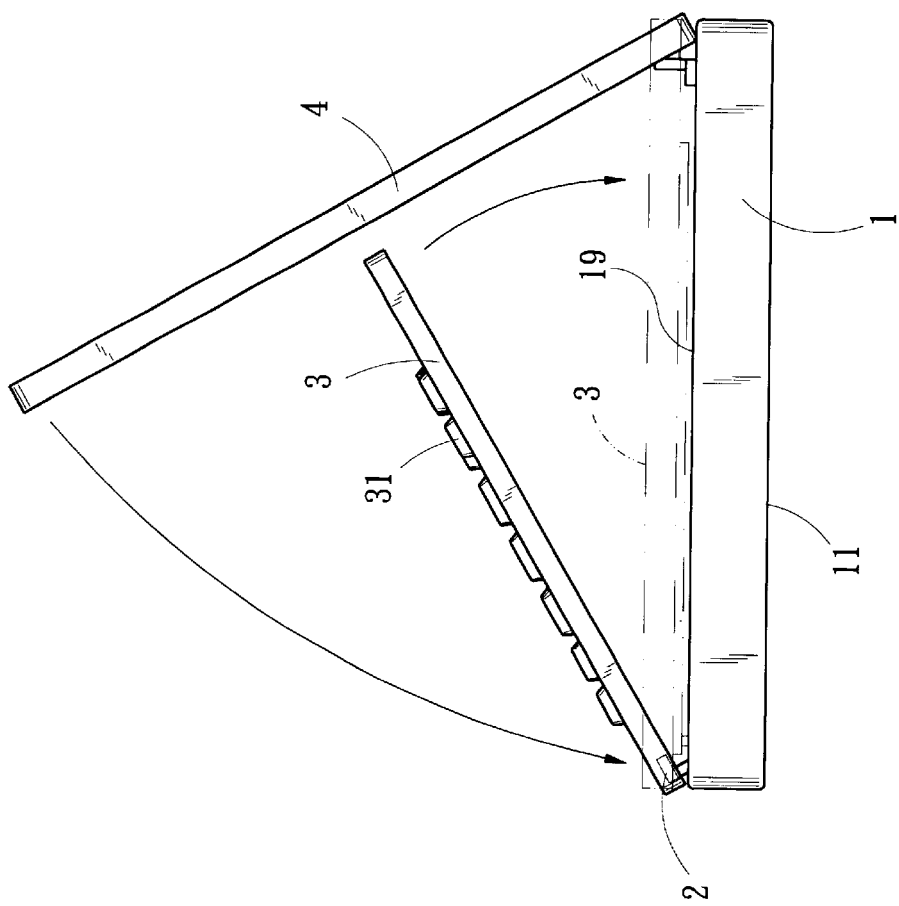
FIG. 5 is a side view showing that the keyboard module of the electronic apparatus is turned rearward and hidden behind the back face of the main body.
Figure 6:
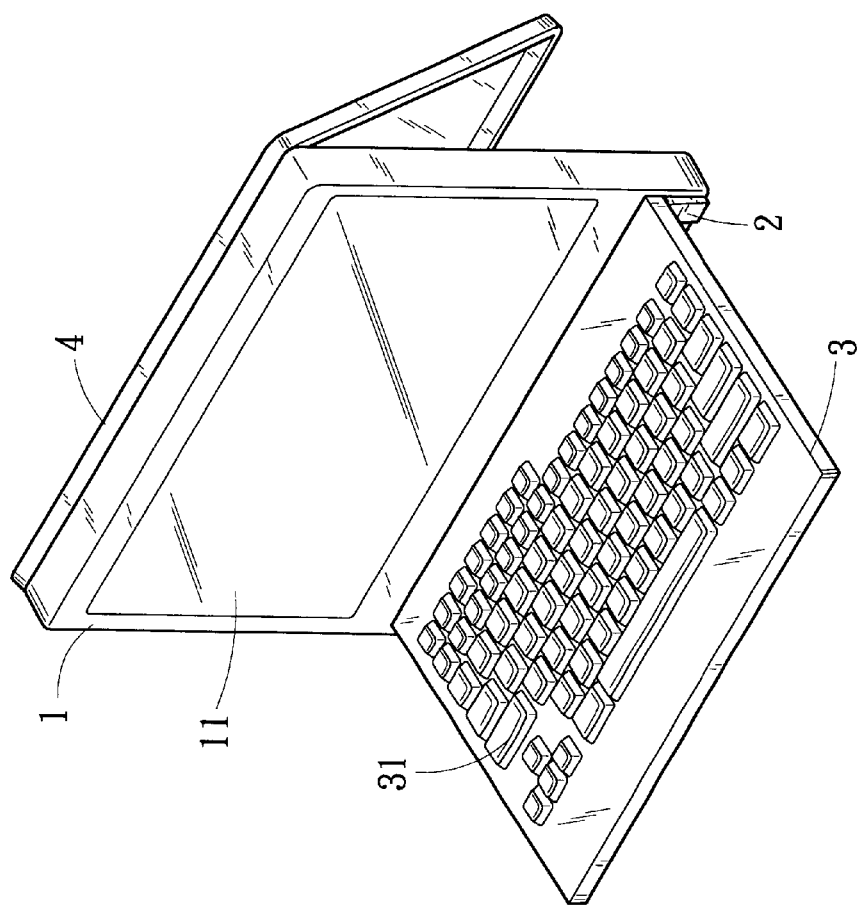
FIG. 6 is a perspective view showing the use of the present invention.

Referring to FIGS. 3, 4 and 6, each bracket member 2 includes a connecting section 21, a fixing section 22 and a linking plate 23 connected between the connecting section 21 and fixing section 22. The connecting section 21 is pivotally connected with the movable end 15 of the first rotary shaft 13 and positioned in the pivot notch 12. Accordingly, the bracket member 2 can pivot on the fixed end 14 of the first rotary shaft 13. The fixing section 22 is coupled with one side of the keyboard module 3 having a set of keys 31. An engaging section 24 projects from front face of the linking plate 23. A free end of the engaging section 24 is formed with an inclined cut face 241. In use, the cut face 241 can correspondingly abut against an inner side of the pivot notch 12 of the main body 1 (as shown in FIG. 4) so as to firmly support the keyboard module 3 and the operation panel 11 of the main body 1. When not used, the keyboard module 3 can be pivoted on the pivot section and folded and hidden behind the main body 1 on back face 19 thereof (as shown in FIG. 5).

In use, the fixed end 14 of the first rotary shaft 13 serves as a fulcrum for the keyboard module 3 and the keyboard module 3 is outward turned by a set angle. At this time, the inclined cut face 241 of the engaging section 24 of the bracket member 2 abuts against the inner side 121 of the pivot notch 12 to keep the keyboard module 3 in a stably supported state. Under such circumstance, a user can use the keyboard module 3 to key in data as shown in FIGS. 3 and 6. The keyboard module 3 can be pivoted and folded onto the back face 19 of the main body 1 as shown in FIG. 5. In addition to the virtual keyboard on the operation panel 11 of the electronic apparatus, a user can alternatively pivot the keyboard module 3 outward and support the keyboard module 3 for quickly keying in data.

In another embodiment of the present invention, a second rotary shaft 16 and bracket members 2A are arranged on the other side of the main body 1 to form pivot sections. A pivot end 18 of the second rotary shaft 16 via the bracket member 2A is pivotally connected with the main body 1. The free end 17 of the second rotary shaft 16 is pivotally connected with one side of a support cover 4. In normal state, the support cover 4 is overlaid on the back face 19 of the main body 1, whereby the keyboard module 3 can be hidden between the support cover 4 and the back face 19 of the main body 1 without outward loosening. A certain torque exists in the pivot section of the support cover 4 so as to prevent the support cover 4 from loosening or turning open itself. When the keyboard module 3 is pivotally turned outward and used, the support cover 4 supports the main body 1 by a certain angle which can be adjusted. Therefore, a user can see the panel 11 and operate the keyboard module 3 by an optimal angle.

The above embodiments are only used to illustrate the present invention, not intended to limit the scope thereof. Many modifications of the above embodiments can be made without departing from the spirit of the present invention.

What is claimed is:

1. Electronic apparatus with keyboard module which can be rotated and hidden, the electronic apparatus comprising an electronic apparatus main body and a keyboard module, one side of the main body being provided with pivot sections, wherein a front face of the main body is provided with an operation panel, one side of the keyboard module being pivotally connected with one side of the main body via the pivot sections, a set of keys being arranged on the front face of the keyboard module, the keyboard module being pivotable on one side of the main body, whereby the keyboard module can be turned forward and supported by a certain angle from the operation panel of the main body or the keyboard module can be turned rearward to attach to a back face of the main body and hidden behind the main body, and wherein the other side of the main body is also provided with pivot sections for pivotally connecting with a support cover, the support cover being overlaid on the back face of the main body, whereby the keyboard module is arranged to be hidden between the support cover and the back face of the main body.

2. Electronic apparatus with keyboard module which can be rotated and hidden as claimed in claim 1, wherein said pivot sections provided on said one side of the main body are composed of a pivot notch and a pivotable bracket member inlaid in the pivot notch.

3. Electronic apparatus with keyboard module which can be rotated and hidden as claimed in claim 1, wherein the pivot section is composed of a pivot notch and a pivotable bracket member inlaid in the pivot notch.

4. Electronic apparatus with keyboard module which can be rotated and hidden as claimed in claim 3, wherein a fixed end of a first rotary shaft is pivotally positioned in a lateral side of the pivot notch, a movable end of the first rotary shaft extending into the pivot notch and being connected with a connecting section of the bracket member.

5. Electronic apparatus with keyboard module which can be rotated and hidden as claimed in claim 3, wherein the bracket member has a connecting section and a fixing section respectively at two ends, a linking plate being connected between the connecting section and the fixing section.

6. Electronic apparatus with keyboard module which can be rotated and hidden as claimed in claim 5, wherein an engaging section projects from a front face of the linking plate, a free end of the engaging section being formed with an inclined cut face, whereby the cut face can correspondingly abut against an inner side of the pivot notch of the main body so as to firmly support the keyboard module.

* * * * *